(12) United States Patent
Won et al.

(10) Patent No.: US 8,626,250 B2
(45) Date of Patent: Jan. 7, 2014

(54) MOBILE TERMINAL HAVING ARRANGED LUMINOUS ELEMENTS

(75) Inventors: Changbai Won, Gyeonggi-Do (KR); Gihoon Tho, Seoul (KR); Yongjin Hwang, Seoul (KR); Jaewook Lee, Gyeonggi-Do (KR); Jaewoo Cho, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 299 days.

(21) Appl. No.: 12/835,389

(22) Filed: Jul. 13, 2010

(65) Prior Publication Data

US 2011/0053652 A1  Mar. 3, 2011

(30) Foreign Application Priority Data

Aug. 26, 2009 (KR) ........................ 10-2009-0079296

(51) Int. Cl.
*H04M 1/00* (2006.01)

(52) U.S. Cl.
USPC .......................................... 455/573; 320/101

(58) Field of Classification Search
USPC ................................ 455/575.1, 566; 370/338
See application file for complete search history.

(56) References Cited

U.S. PATENT DOCUMENTS

| 2005/0079897 A1* | 4/2005 | Nishijima et al. ......... 455/575.1 |
| 2007/0032268 A1* | 2/2007 | Gotfried ....................... 455/558 |
| 2009/0137287 A1* | 5/2009 | Hsiao ........................... 455/572 |

FOREIGN PATENT DOCUMENTS

| CN | 2924944 Y | 7/2007 |
| CN | 101452970 A | 6/2009 |

* cited by examiner

*Primary Examiner* — Marcos Batista
(74) *Attorney, Agent, or Firm* — Birch, Stewart, Kolasch & Birch, LLP

(57) ABSTRACT

A mobile terminal including a wireless communication unit configured to wirelessly communicate with at least one other terminal; a terminal body including a battery; a solar cell disposed on one surface of the terminal body, and configured to convert light energy into electric energy to supply power to the battery; a plurality of luminous elements arranged on one surface of the solar cell; and a controller configured to control the luminous elements to display visual information and to execute a predetermined operation based on a selection of predetermined displaying luminous elements among the plurality of luminous elements.

18 Claims, 9 Drawing Sheets

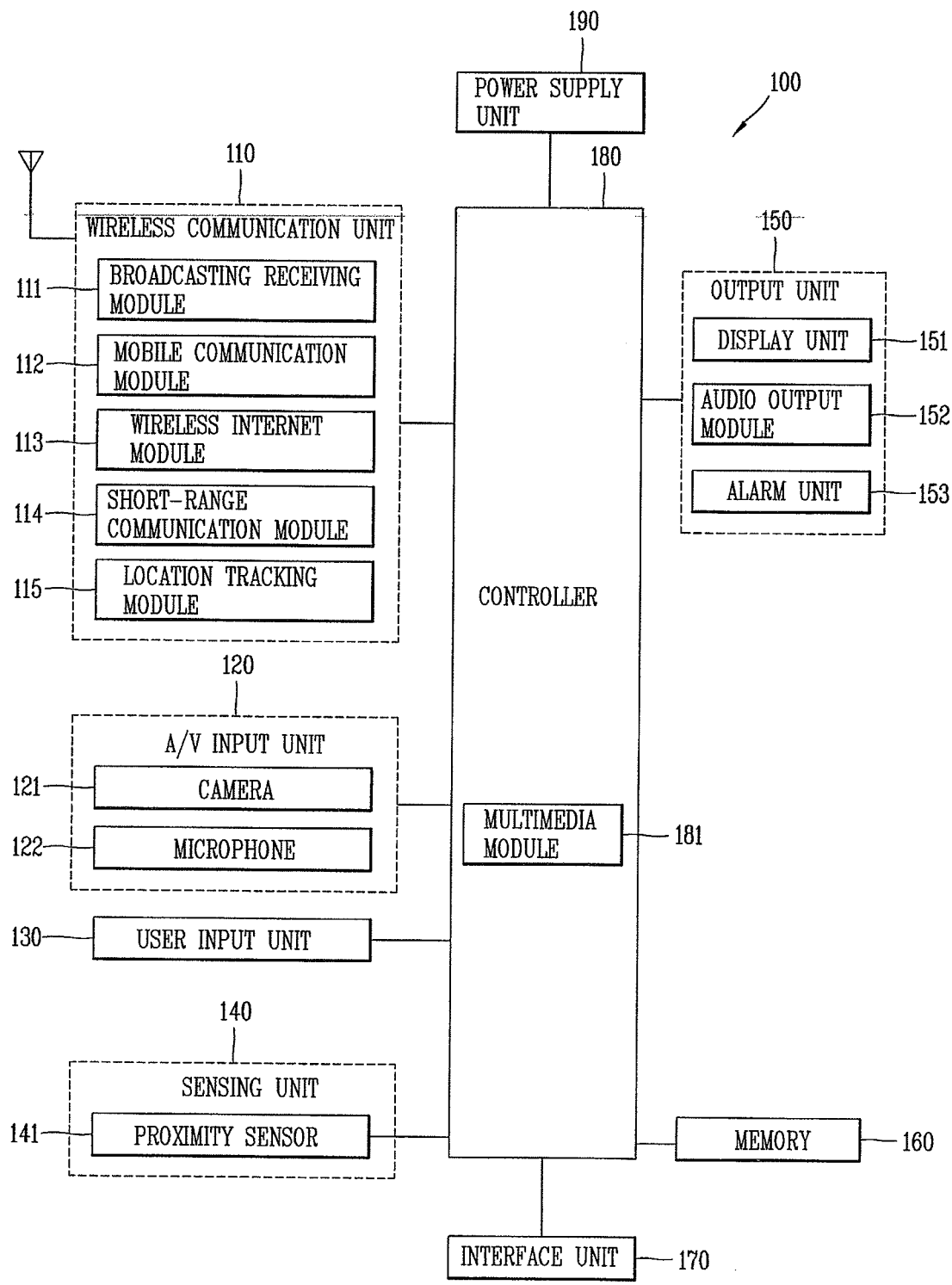

MOBILE TERMINAL HAVING ARRANGED LUMINOUS ELEMENTS

CROSS-REFERENCE TO A RELATED APPLICATION

Pursuant to 35 U.S.C. §119(a), this application claims the benefit of earlier filing date and right of priority to Korean Application No. 10-2009-0079296, filed on Aug. 26, 2009, the contents of which is incorporated by reference herein in its entirety.

BACKGROUND OF THE INVENTION

1. Field of the Invention

The present invention relates to a mobile terminal having a solar cell.

2. Background of the Invention

Terminals may be divided into mobile/portable terminals and stationary terminals according to their mobility. Also, the portable terminals may be categorized into a handheld terminal and a vehicle mount terminal according to whether it is directly portable by a user.

As it becomes multifunctional, the terminal can be allowed to capture still images or moving images, play music or video files, play games, receive broadcast and the like, so as to be implemented as an integrated multimedia player.

Improvement may be considered for structures and/or software of terminals in order to support and implement such complicated functions.

Recently, users are getting interested in electronic devices employing an eco-friendly technology, which results in increase in an application of a solar cell to the mobile terminal.

SUMMARY OF THE INVENTION

Therefore, an object of the present invention is to provide a mobile terminal having a solar cell, which allows a space having the solar cell to be utilized as a display space of visual information, thereby improving the spatial usability.

To achieve these and other advantages and in accordance with the purpose of the present invention, as embodied and broadly described herein, there is provided a mobile terminal including a terminal body having a battery, a solar cell disposed on one surface of the terminal body, and configured to convert light energy into electric energy to supply power to the battery, a plurality of luminous elements arranged on one surface of the solar cell, and a controller configured to control the luminous elements to display visual information by combining light emitted from each of the luminous elements.

A transparent sheet may further be disposed on a front surface of the solar cell so as to support the luminous elements, and the transparent sheet may include transparent conductive patterns electrically connected to the luminous elements so as to render luminous signals applied to the luminous elements.

The luminous elements may be attached onto the front surface of the solar cell, and transparent conductive patterns may be formed on the front surface of the solar cell, the conductive patterns being electrically connected to the luminous elements to render luminous signals applied to the luminous elements.

A touch sheet may further be disposed either on the transparent sheet or on the front surface of the solar cell so as to detect a touch input on the visual information.

Each of the conductive patterns may be configured to generate a touch signal upon a touch input being detected on the visual information.

The controller may be configured to selectively operate part of the luminous elements to represent the visual information, and the visual information may include at least one of character, number, symbol and image.

In another aspect, the present invention provides a mobile terminal including a wireless communication unit configured to wirelessly communicate with at least one other terminal; a terminal body including a battery; a solar cell disposed on one surface of the terminal body, and configured to convert light energy into electric energy to supply power to the battery; a plurality of luminous elements arranged on one surface of the solar cell; and a controller configured to control the luminous elements to display visual information and to execute a predetermined operation based on a selection of predetermined displaying luminous elements among the plurality of luminous elements. The present invention also provides a corresponding method of controlling a mobile terminal.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 is a block diagram of a mobile terminal in accordance with one embodiment of the present invention;

DETAILED DESCRIPTION OF THE INVENTION

Figure 2A:
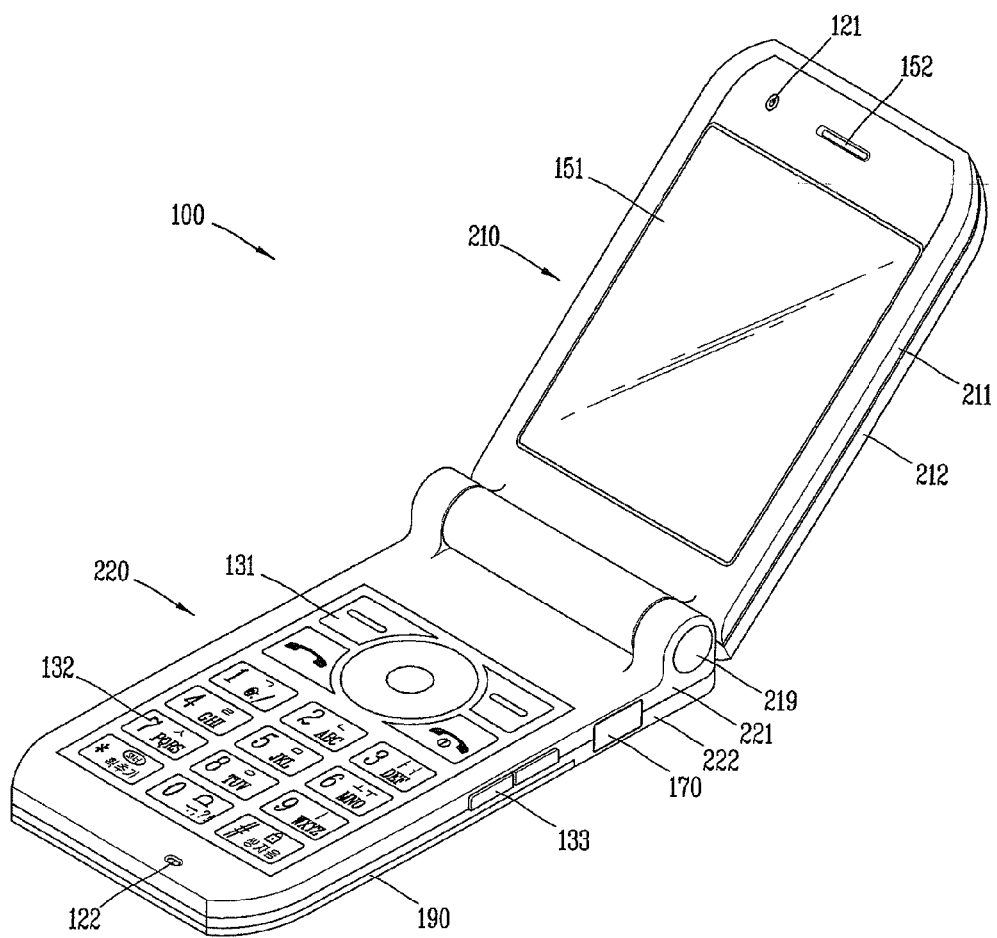
FIGS. 2A and 2B are front perspective views of the mobile terminal in accordance with the one embodiment of the present invention.

Description will now be given in detail of preferred configurations of mobile terminals according to the present invention, with reference to the accompanying drawings. Hereinafter, suffixes "module" and "unit or portion" for components used herein in description are merely provided only for facilitation of preparing this specification, and thus they are not granted a specific meaning or function. Hence, it should be noticed that "module" and "unit or portion" can be used together.

Mobile terminals described in the present invention may include mobile phones, smart phones, laptop computers, digital broadcasting terminals, personal digital assistants (PDAs), portable multimedia players (PMPs), navigators, and the like.

FIG. 1 is a block diagram of a mobile terminal in accordance with one exemplary embodiment of the present invention.

The mobile terminal 100 may comprise components, such as a wireless communication unit 110, an Audio/Video (A/V) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more components which permit wireless communications between the portable terminal 100 and a wireless communication system or between the portable terminal 100 and a network within which the portable terminal 100 is located. For example, the wireless communication unit 110 may include a broadcast receiving module 111, a mobile communication module 112, a wireless internet module 113, a short-range communication module 114, a position location module 115 and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the portable terminal. The broadcast signal may be implemented as a TV broadcast signal, a radio broadcast signal, and a data broadcast signal, among others. The broadcast signal may further include a data broadcast signal combined with a TV or radio broadcast signal.

The broadcast associated information may indicate information relating to broadcast channels, broadcast programs or broadcast service providers. Further, the broadcast associated information may be provided via a mobile communication network and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T), and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external terminal, a server, etc.) on a mobile communication network. Here, the wireless signals may include audio call signal, video call signal, or various formats of data according to transmission/reception of text/multimedia messages.

The wireless internet module 113 supports wireless Internet access for the portable terminal. This module may be internally or externally coupled to the portable terminal 100. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like.

The position location module 115 denotes a module for detecting or calculating a position of a portable terminal. An example of the position location module 115 may include a Global Position System (GPS) module.

The A/V input unit 120 is configured to provide audio or video signal input to the mobile terminal. The A/V input unit 120 may include a camera 121 and a microphone 122. The camera 121 receives and processes image frames of still pictures or video obtained by image sensors in a video (telephony) call mode or a capturing mode. The processed image frames may be displayed on a display unit 151.

The image frames processed by the camera 121 may be stored in the memory 160 or transmitted to the exterior via the wireless communication unit 110. Two or more cameras 121 may be provided according to the configuration of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touchpad (e.g., static pressure/capacitance), a jog wheel, a jog switch and the like.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the orientation of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device and the like. Moreover, the sensing unit 140 may include a proximity sensor 141.

The output unit 150 is configured to output an audio signal, a video signal or an alarm signal. The output unit 150 may include a display unit 151, an audio output module 152, an alarm 153, a haptic module 154 and the like.

The display unit 151 may output information processed in the mobile terminal 100. For example, when the mobile terminal is operating in a phone call mode, the display unit 151 will provide a User Interface (UI) or a Graphic User Interface (GUI) which includes information associated with the call. As another example, if the mobile terminal is in a video call mode or a capturing mode, the display unit 151 may additionally or alternatively display images captured and/or received, UI, or GUI.

The display unit 151 may be implemented using, for example, a Liquid Crystal Display (LCD), a Thin Film Transistor-Liquid Crystal Display (TFT-LCD), an Organic Light-Emitting Diode (OLED), a flexible display, a three-dimensional (3D) display, or the like.

Some of the displays can be configured to be transparent such that it is possible to see the exterior therethrough. These displays may be called transparent displays. A representative example of the transparent display may include a Transparent Organic Light Emitting Diode (TOLED), and the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

Here, if the display unit 151 and a touch sensitive sensor (referred to as a 'touch sensor') have a layered structure therebetween, the structure may be referred to as 'touch screen'. In this structure, the display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

As shown in FIG. 1, a proximity sensor 141 may be arranged at an inner region of the mobile terminal 100 covered by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the mobile terminal 100, e.g., sound alarming a call received or a message received, and so on. The audio output module 152 may include a receiver, a speaker, a buzzer, and so on.

The alarm 153 outputs signals notifying occurrence of events from the mobile terminal 100. The events occurring from the mobile terminal 100 may include call received, message received, key signal input, touch input, and so on. The alarm 153 may output not only video or audio signals, but also other types of signals such as signals notifying occurrence of events in a vibration manner. Since the video or audio signals can be output through the display unit 151 or the audio output unit 152, the display unit 151 and the audio output module 152 may be categorized into a part of the alarm 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 provides power required by various components under the control of the controller 180. The provided power may be internal power, external power, or combination thereof.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Figure 2B:
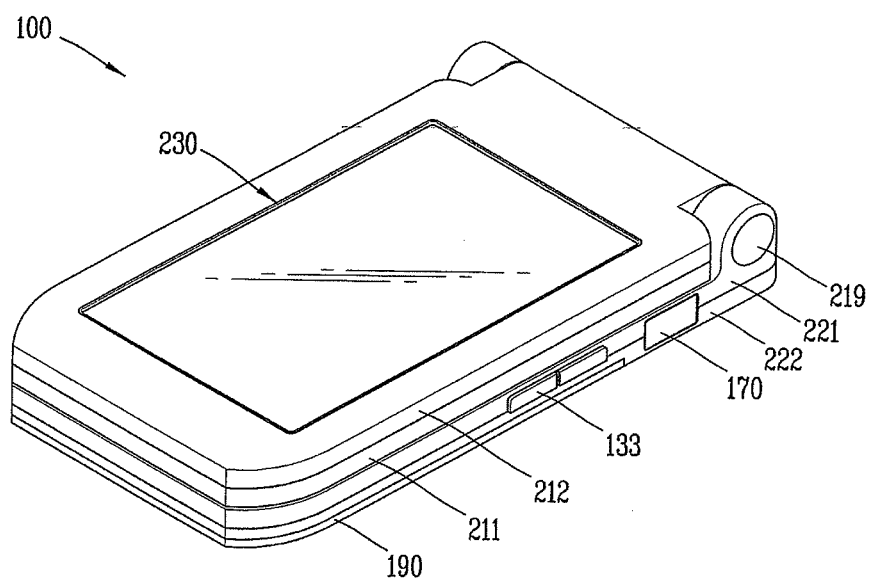

FIGS. 2A and 2B are front perspective views of the mobile terminal in accordance with the one embodiment of the present invention.

A mobile terminal 100 according to the one embodiment may include a first body 210 and a second body 220 foldably coupled to each other. Here, the present invention may not be limited to the 'folder type' mobile terminal but be applicable to various types of mobile terminals, such as a slide type, a folder type, a swing type, a swivel type and the like.

In accordance with the one embodiment, the first body 210 and the second body 220 may rotatably be coupled via a hinge unit 219. The hinge unit 219 may include therein a cam member for providing an elastic force during rotation of the first body 210, and a connection member for electrically connecting the first body 210 to the second body 220.

If the first body 210 exposes at least part of the second body 220 as illustrated in FIG. 2A, the state may be referred to as 'unfolding configuration,' and if the first body 210 and the second body 220 are overlapped each other as shown in FIG. 2B, the state may be referred to as 'folding configuration.'

The mobile terminal 100 normally operates in a standby or idle mode in a closed configuration, but the standby mode may be released by a user's manipulation. Also, the mobile terminal 100 operates in a phone call mode, an edition mode and the like in an open configuration, but may be converted into the standby mode by a user's manipulation or after a preset time elapses.

A case (casings, covers, housings) forming an outer appearance of the first body 210 may be implemented by a front case 211 and a rear case 212. Various electronic components may be mounted within a space formed by the front case 211 and the rear case 212. At least one intermediate case may further be disposed between the front case 211 and the rear case 212.

The cases may be formed by injection-molded synthetic resin, or may be formed using a metallic material such as stainless steel (STS) or titanium (Ti).

The first body 210, in detail, the front case 211 is shown having a display unit 151, a speaker (an audio output module) 152, a camera 121 and the like.

Similar to the first body 210, a front case 221 and a rear case 222 may configure the second body 220. The second body 220 is shown having a user input unit 130 (e.g., 131, 132 and 133), a microphone 122, an interface unit 170 and the like.

The user input unit 130 may include first to third manipulation units 131, 132 and 133, which can be manipulated in any tactile manner that a user can make a touch input.

The one embodiment exemplarily illustrates first and second manipulation units 131 and 132 in the form of a keypad and a third manipulation unit 133 in the form of a side key. Front the functional perspective, the first manipulation unit 131 may be configured to input commands, such as START, END, SCROLL or the like, and the second manipulation unit 132 may be configured to input numbers, characters, symbols or the like. Also, the third manipulation unit 133 may function as a hot-key for performing specific functions, such as activation of the camera 121 and the like.

A power supply unit 190 for supplying power to the mobile terminal may be mounted to the rear case 222 of the second body 220. The power supply unit 190 may be, for example, a rechargeable battery so as to be detachable for charging.

Referring to FIG. 2B, a luminous element assembly 230 may be disposed at the rear case 212 of the first body 210. The luminous element assembly 230 may include a plurality of luminous elements 231 (see FIG. 3), and configured to combine light emitted from the light elements 231 and thereby display visual information. For example, the luminous element assembly 230 may work to display an originator's phone number upon a call reception (see FIG. 6B).

This embodiment illustrates that the luminous element assembly 230 is disposed at an outer surface of the first body 210; however, in addition to this structure, the luminous element assembly 230 may be disposed at various positions. That is, the luminous element assembly 230 may be located on at least one of the first body 210 and the second body 220. However, a folder type mobile terminal has a structural characteristic that information cannot be displayed in a closed state because the display unit 151 is not exposed. Accordingly, for the folder type mobile terminal, preferably, the luminous assembly 230 is disposed at an externally exposed surface in the closed state so as to display visual information even in the closed state.

Figure 3:
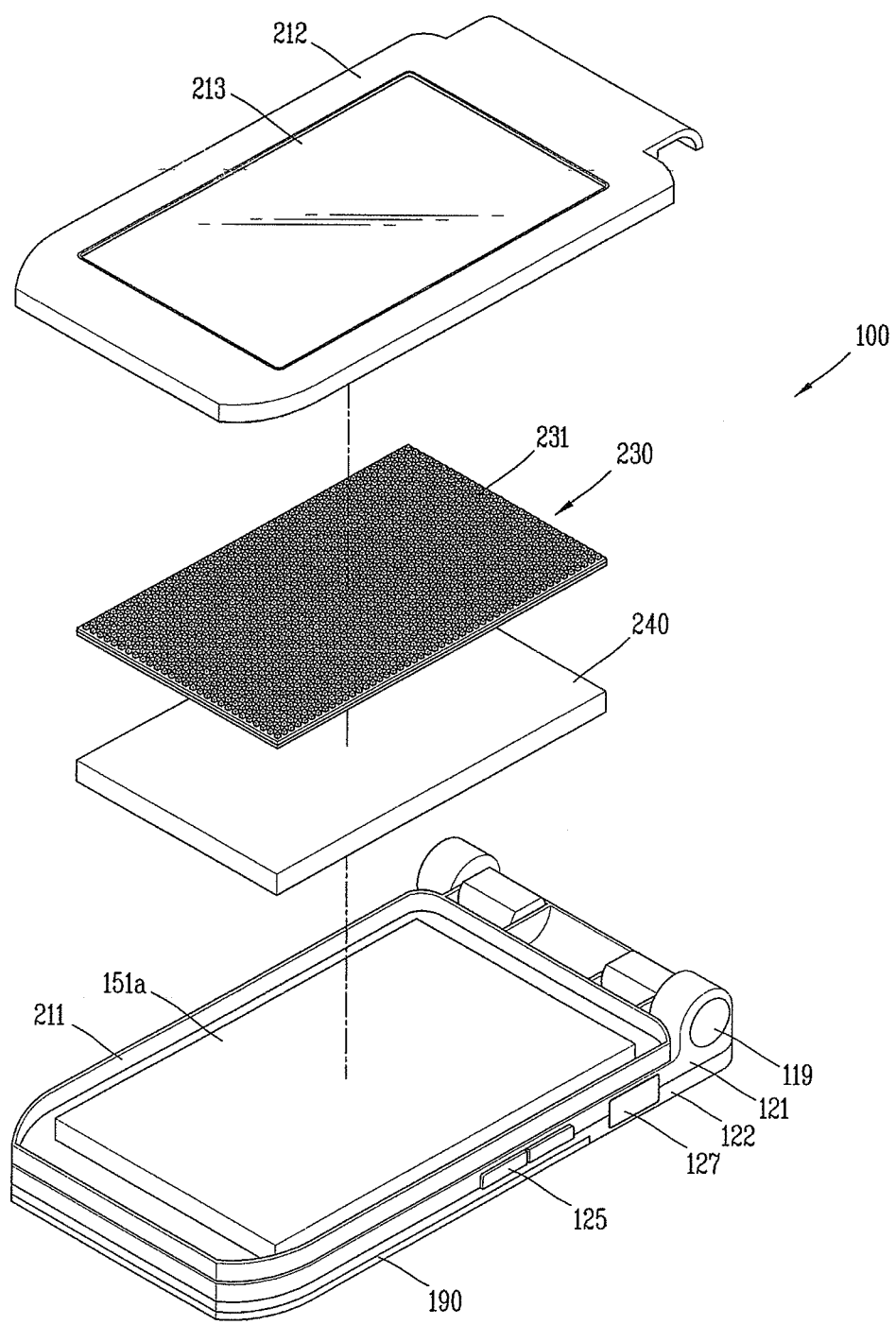
FIG. 3 is a disassembled perspective view of the mobile terminal in accordance with the one embodiment of the present invention.
Figure 4:
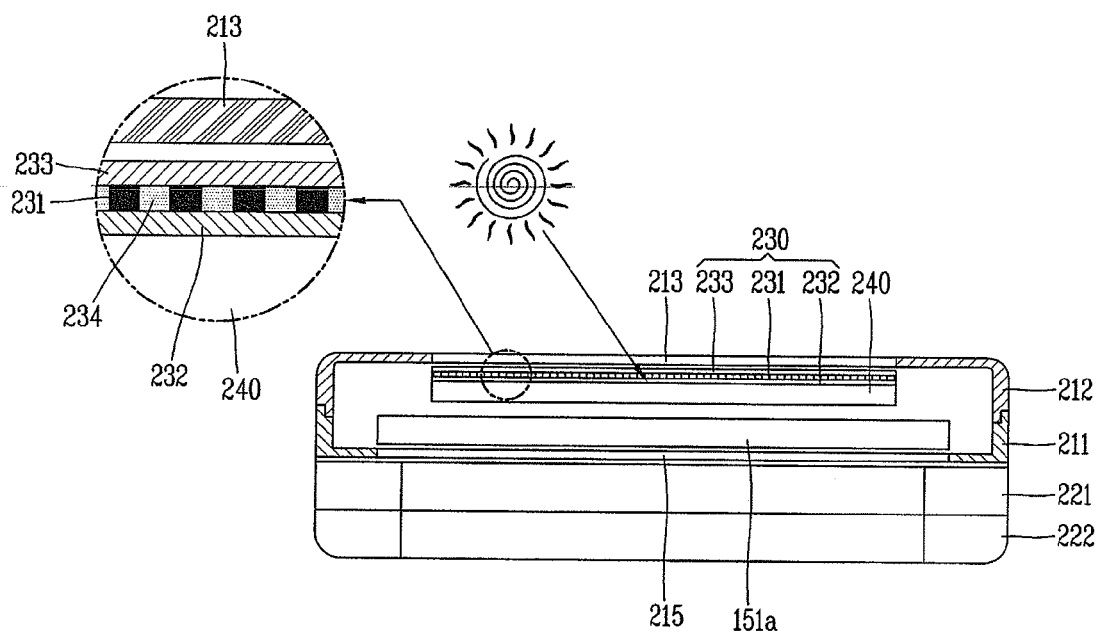
FIG. 4 is a sectional view of the mobile terminal shown in FIG. 3.

FIG. 3 is a disassembled perspective view of the mobile terminal in accordance with the one embodiment of the present invention, and FIG. 4 is a sectional view of the first body shown in FIG. 3.

FIG. 3 illustrates a separated state of the first body into the front case and the rear case.

A transparent window 213 may be disposed at the rear case 212 so as to externally view (identify) light emitted from the luminous element assembly 230. Here, 'transparent' may include 'completely transparent' or 'semitransparent'.

The transparent window 213 may preferably be formed of a semitransparent material such that the luminous elements 231 cannot be viewed from the exterior when the luminous elements 231 do not emit light. Alternatively, the entire rear case 212 may be formed of a transparent material, instead of disposing the transparent window 213 at the rear case 212.

A display module 151a may be mounted between the front case 211 and the rear case 212, and a window 215 for allowing output information on the display unit 151 to be externally visible may be mounted at one side of the display module 151a.

A solar cell 240 for generating electrical energy by using ambient light of the mobile terminal may be mounted at another side of the display module 151a. The solar cell 240 may convert optical energy into electrical energy to supply power to the battery 190 (i.e., the power supply unit). The solar cell 240 denotes a semiconductor device for converting optical energy into electrical energy by virtue of a photo voltaic effect. The present invention may employ various types of solar cells, such as silicon solar cell, thin film solar cell, dye-sensitized solar cell and the like, and preferably employ a solar cell with an extremely thin thickness so as to slim the thickness of the mobile terminal.

The luminous element assembly 230 may include a plurality of luminous elements 231. The luminous elements 231 may be aligned in a matrix configuration with preset intervals in horizontal and vertical directions. The controller 180 (see FIG. 1) may control the luminous elements 231 to combine lights emitted therefrom such that visual information can be represented. The visual information may be represented by selectively operating part of the luminous elements 231 aligned in the matrix configuration.

The luminous elements 231 may be implemented by use of light emitting diodes (LEDs) for reducing power loss and fabricating cost. Also, the luminous elements 231 may be implemented by using elements capable of representing monochromic color or plural colors. A representative luminous element 231 for representing a plurality of colors may include an RGB light emitting diode, which is configured to combine segments, which are capable of representing red, green and blue colors, and implement other colors by on/off combination of each segment.

According to the present invention, the luminous elements 231 may be disposed on one surface of the solar cell 240, namely, on a light (optical) absorption surface of the solar cell 240. The luminous elements 231 may be arranged with having spaces left for light absorption of the solar cell 240. Therefore, the solar cell 240 may absorb light through the spaces non-arranged by the luminous elements 231, thereby generating electrical energy.

As such, the present invention disposes the luminous elements 231 to overlap with the solar cell 240, such that a single space can be simultaneously used as 'space for generating electrical energy' and 'space for displaying visual information.' In other words, in view of employing the solar cell 240 on the outer surface of the mobile terminal, the installation space of the solar cell 240 can be utilized as a display space for visual information, thereby reducing a dead space defined due to the installation of the solar cell 240.

The luminous element assembly 230 according to the one embodiment of the present invention may further include a transparent sheet 232 for supporting the luminous elements 231. The transparent sheet 232 may have transparent conductive patterns electrically connected to the luminous elements 231. The conductive patterns may function to electrically connect each of the luminous elements 231 to the controller 180 and to transfer a luminous signal generated from the controller 180 to the luminous elements 231. The conductive patterns may be formed of a transparent conductive material, for example, indium tin oxide (ITO) and the like.

The conductive patterns may be formed on a front surface of the transparent sheet 232. The luminous elements 231 may be attached in a preset arrangement on the front surface of the transparent sheet 232 having the conductive patterns.

A transparent protection film 233 for protecting the luminous elements 231 may further be attached on the front surface of the transparent sheet 232. In addition, an intermediate sheet 234 may further be located between the protection film 233 and the transparent sheet 232 so as to allow smooth surface-contact therebetween. Here, the intermediate sheet 234 may define the spaces excluding the spaces having the luminous elements 231, and have the same thickness as the height of the luminous elements 231.

According to this embodiment, the luminous elements 231, the transparent sheet 232 and the protection film 233 may be coupled together so as to implement the luminous element assembly 230. The luminous element assembly 230 may be attached onto a front surface of the solar cell 240 by use of an adhesive or adhesive sheet. The components configuring the luminous element assembly 230, excluding the luminous elements 231 may be made of a transparent material such that ambient light of the mobile terminal can be transmitted therethrough so as to reach the solar cell 240.

The user may lay the mobile terminal so that the surface having the solar cell 240 faces upward, thereby charging the battery 190.

Figure 5:
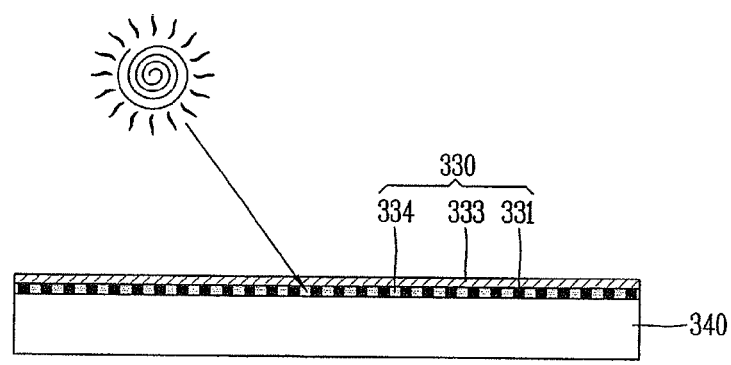
FIG. 5 is a sectional view of a luminous element assembly in accordance with a second embodiment of the present invention.

FIG. 5 is a sectional view of a luminous element assembly in accordance with a second embodiment of the present invention. This embodiment employs like/similar reference numerals for like/similar components irrespective of different embodiments, so they all will be understood by the first description.

A luminous element assembly 330 according to this embodiment may be configured in the form of luminous elements 331 being attached on a front surface of a solar cell 340. The luminous elements 331 may be attached onto the solar cell 340 by use of an adhesive or adhesive film.

According to this embodiment, transparent conductive patterns electrically connected to the luminous elements 331 may be formed on the front surface of the solar cell 340. The conductive patterns may function, as similar to the previous embodiment, to connect the plurality of luminous elements 331 to the controller 180, respectively, so as to render a luminous signal generated from the controller 180 applied to the luminous elements 331.

Similar to the previous embodiment, a protection film 333 and an intermediate sheet 334 may further be provided.

In this embodiment, the luminous elements 331 are attached directly onto the front surface of the solar cell 340 and the conductive patterns are formed directly on the front surface of the solar cell 340. Hence, this structure does not need the transparent sheet 232 provided in the previous embodiment. Therefore, the luminous element assembly 330 may become slimmer in thickness as compared to that of the previous embodiment.

Figure 6A:
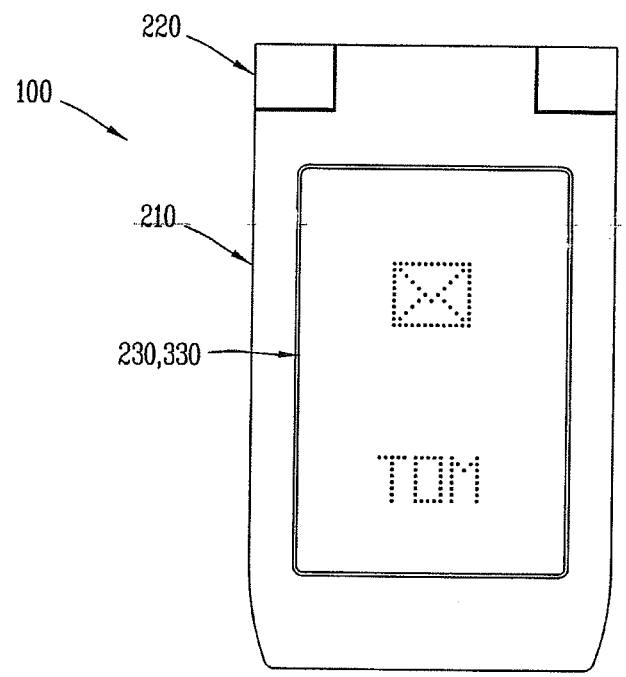
FIGS. 6A and 6B are views illustrating operating states of the mobile terminal employing the luminous element assemblies of FIGS. 4 and 5, respectively.
Figure 6B:
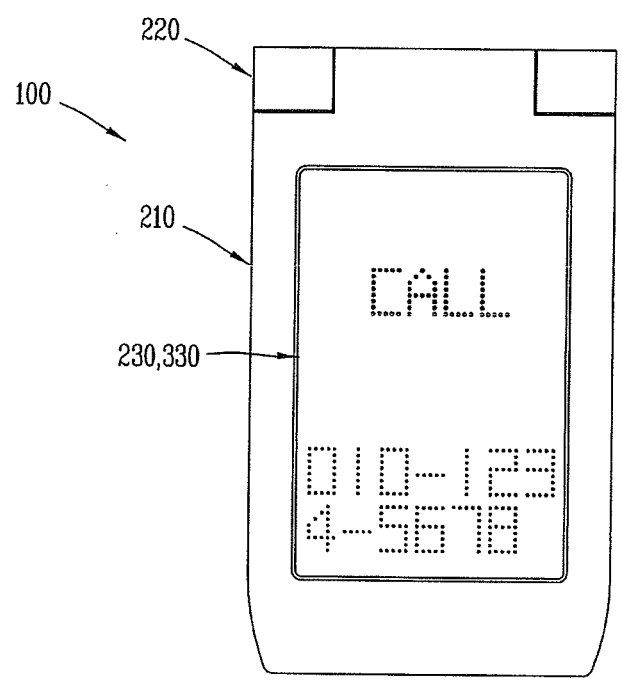

FIGS. 6A and 6B are views illustrating operating states of a mobile terminal respectively employing the luminous element assembly 230, 330 having described above.

Visual information represented by the luminous element assembly 220, 330 may include at least one of character, number, symbol and image. Such visual information may inform an originator's name, an originator's phone number and the like upon reception of call or text message. In addition, the visual information may be represented in the form of text, image and the like relating to indication information which notifies users of generation of a specific event (e.g., preset alarm, preset time, etc.).

As one example, FIG. 6A illustrates that a user is informed of reception of a text message through an image represented by the luminous element assembly 220, 230, and additionally informed of an originator's name.

Further, FIG. 6B illustrates displaying of an originator's phone number by the luminous element assembly 220, 330 upon a call reception.

Figure 7:
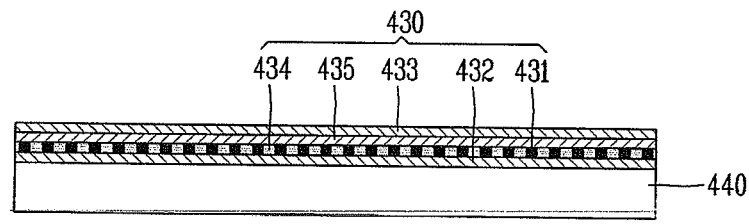
FIG. 7 is a sectional view of a luminous element assembly in accordance with a third embodiment of the present invention.

FIG. 7 is a sectional view of a luminous element assembly in accordance with a third embodiment of the present invention. This embodiment employs like/similar reference numerals for like/similar components irrespective of different embodiments, so they all will be understood by the first description.

A luminous element assembly 430 according to the third embodiment may further include a touch sheet 435, which is touch-sensitive, in addition to the aforementioned configuration. FIG. 7 illustrates the touch sheet 435 is further provided in addition to the configuration of the first embodiment having described above.

The luminous element assembly 430 may include luminous elements 431, a transparent sheet 432 and the like. The touch sheet 435 may be located on one surface of the transparent sheet 432. This embodiment exemplarily illustrates that the touch sheet 435 is attached onto the front surface of the transparent sheet 432; however, the same may alternatively be attached onto a rear surface of the transparent sheet 432.

The touch sheet 435 may be configured to detect a touch input on visual information represented by the luminous elements 431. The touch sheet 435 is shown having conductive patterns for generating an electric signal upon being touched.

FIG. 7 exemplarily illustrates that the touch sheet 435 is further provided to the configuration according to the first embodiment; however, it may alternatively be possible that the touch sheet 435 is further provided to the configuration of the second embodiment.

Figure 8:
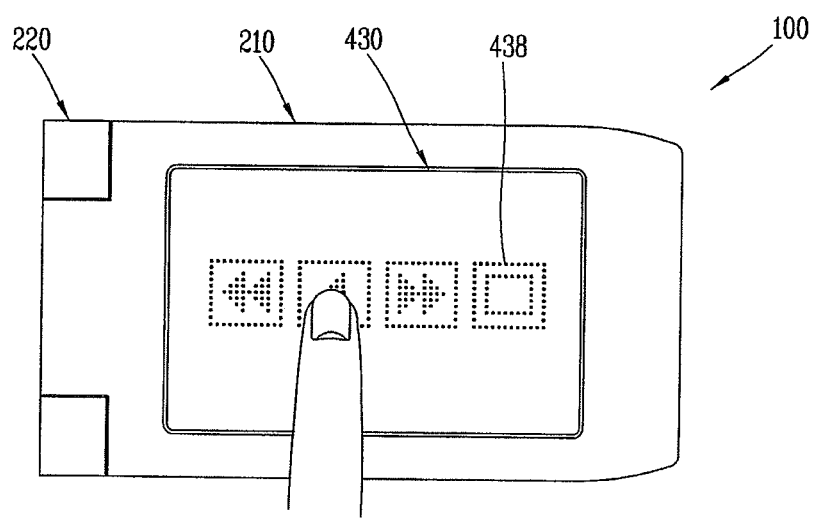
FIG. 8 is a view illustrating an operating state of a mobile terminal having the luminous element assembly of FIG. 7.

FIG. 8 is a view illustrating an operating state of a mobile terminal having the luminous element assembly of FIG. 7.

Visual information represented by the luminous element assembly 430 may include information for a touch input. For example, the visual information may be configured in the form of a keypad, which may be referred to as 'soft keys.'

FIG. 8 exemplarily illustrates that the luminous element assembly 430 represents soft keys 438, namely, illustrates the soft keys 438 for controlling reproduction of music, for example, reproducing, stopping or pausing of music while listing to the music. A user may also enter desired information by touching the soft keys 438. The luminous element assembly 430 can also display phone calling or texting commands, and the controller 180 then executes a corresponding phone calling or texting operation when a corresponding phone calling or texting command is selected.

The luminous element assembly 430 can also display shortcut icon information, icon information for frequently used operations, and icon information for different applications downloaded onto the terminal, calendar information, Internet operations, etc. The controller 180 then executes a corresponding operation when a displayed corresponding icon information is selected.

That is, the luminous element assembly 430 may perform a similar function to a 'touch screen' in combination with the touch sheet 435, and herein the features relating to touch input described in FIG. 1 may all be applicable to this structure.

Figure 9:
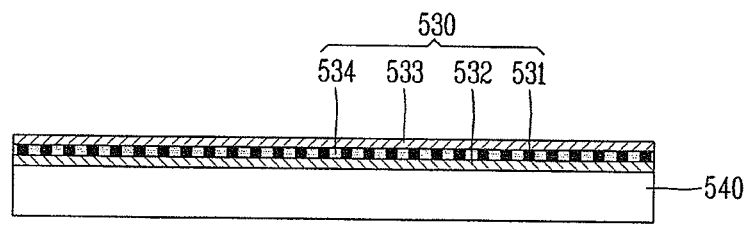
FIG. 9 is a sectional view of a luminous element assembly in accordance with a fourth embodiment of the present invention.

FIG. 9 is a sectional view of a luminous element assembly in accordance with a fourth embodiment of the present invention. This embodiment employs like/similar reference numerals for like/similar components irrespective of different embodiments, so they all will be understood by the first description.

A luminous element assembly 530 according to the present invention may be configured to be touch-sensitive, similar to the luminous element assembly 430 of the third embodiment. Here, the luminous element assembly 530 according to this fourth embodiment does not include the touch sheet 435 of the previous embodiment.

That is, the luminous element assembly 530 according to this embodiment may include luminous elements 531, a transparent sheet 532, a protection film 533 and the like, similar to the configuration of the first embodiment. According to this embodiment, conductive patterns formed on the transparent sheet 532 may be used to detect touch inputs. The conductive patterns may be configured to generate a touch signal (electric signal) upon a touch being input on visual information.

Hence, the conductive patterns of the transparent sheet 532 may perform not only a function of detecting touch inputs but also a function of applying a luminous signal to the luminous elements 531.

Figure 10:
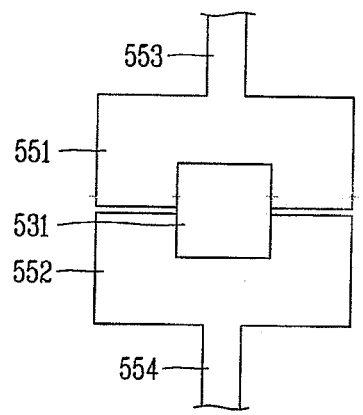
FIG. 10 is a schematic view illustrating a structure of a conductive pattern provided at a transparent sheet of FIG. 9.

FIG. 10 is a schematic view illustrating a structure of the conductive pattern provided at the transparent sheet of FIG. 9.

Referring to FIG. 10, each conductive pattern for detecting touch inputs and transferring luminous signals may include first and second transparent patterns 551 and 552, and transparent lines 553 and 554.

The first pattern 551 may have one end connected to one side of the luminous element 531 and occupy a partial area of a touch region. The second pattern 552 may have one end connected to another side of the luminous element 531 and occupy the residual area of the touch region. That is, the area defined by the first and second patterns 551 and 552 may configure a touch region for allowing touch inputs. One of the first and second patterns 551 and 552 may be connected to an anode of the luminous element 531 and another one connected to a cathode of the luminous element 531.

The transparent lines 553 and 554 may be connected to another ends of the first and second patterns 551 and 552, respectively, and electrically connected to the controller 180 for control of the luminous elements 531. The transparent lines 553 and 554 may be electrically connected to a flexible printed circuit board attached onto the transparent sheet 532.

The first and second patterns 551 and 552 may generate an electric signal upon a touch input being detected on a touch region. Such electric signal, namely, a touch signal, is forwarded to the controller 180 via the transparent lines 553 and 554. In addition, the luminous signals generated from the controller 180 may be forwarded to the luminous elements 531 via the transparent lines 553 and 554 and the first and second patterns 551 and 552.

The concept that a single layered conductive pattern having described above is used to implement the two functions of touch detection and luminous signal transfer may be equally applied to the configuration described in the second embodiment.

Figure 11:
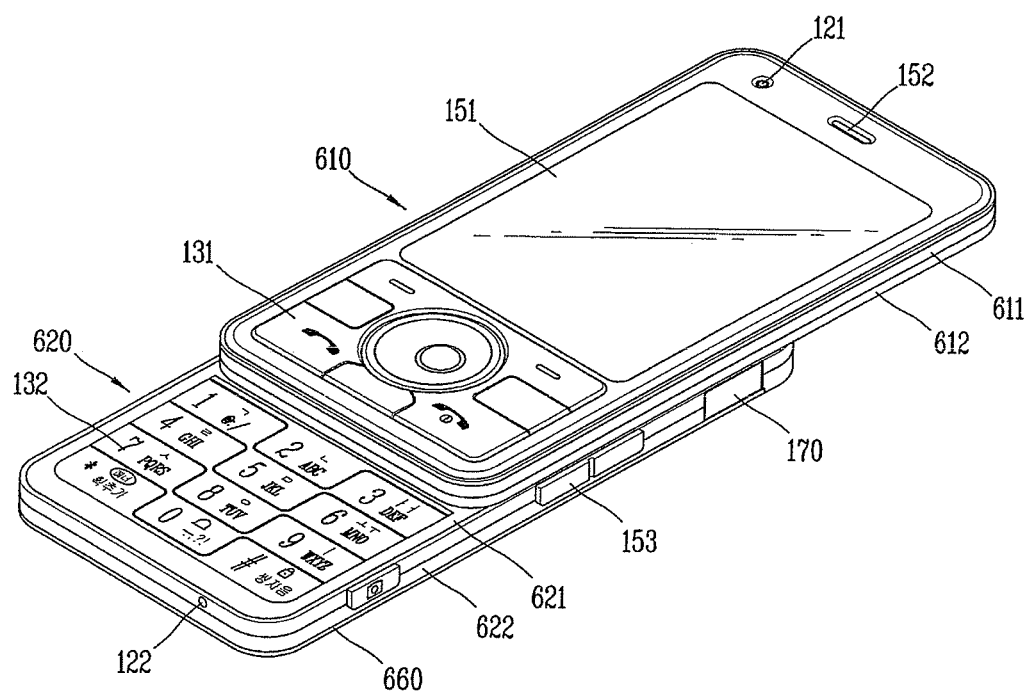
FIG. 11 is a front perspective view of a mobile terminal in accordance with another embodiment of the present invention.
Figure 12:
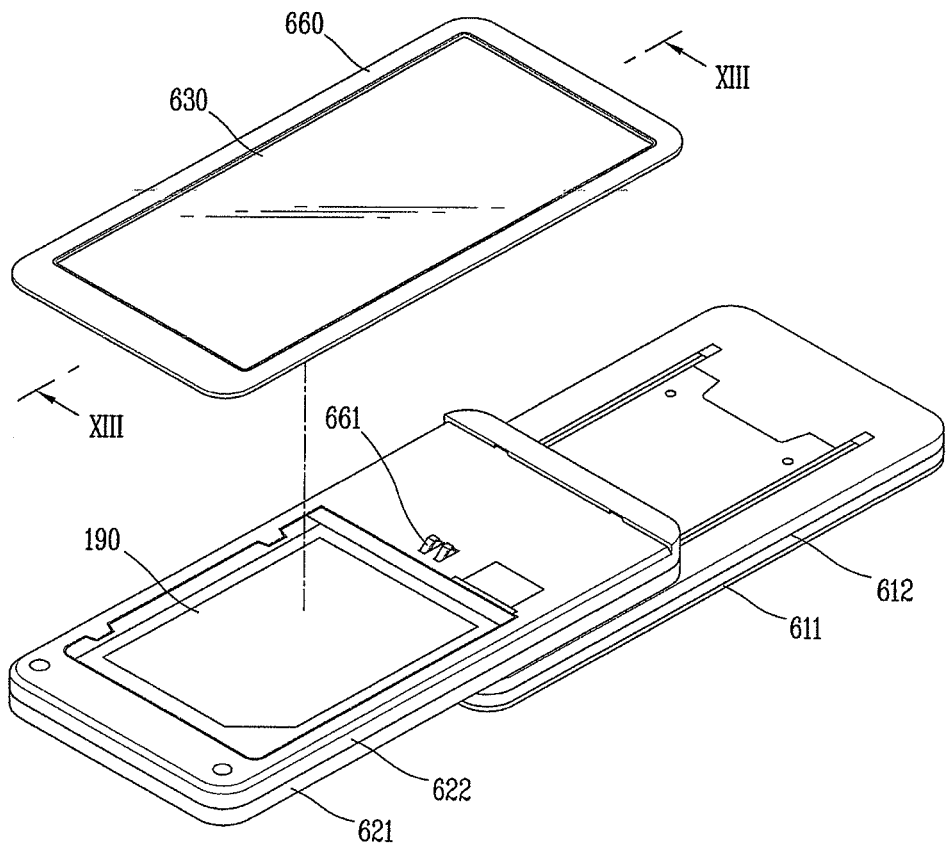
FIG. 12 is a rear perspective view of the mobile terminal shown in FIG. 11.

FIG. 11 is a front perspective view of a mobile terminal in accordance with another embodiment of the present invention, and FIG. 12 is a rear perspective view of the mobile terminal shown in FIG. 11.

FIG. 11 exemplarily illustrates a slide type terminal having first body 610 and a second body 620. The first and second bodies 610 and 620 may be coupled to be relatively slidable from each other.

The first body 610 is illustrated having the display unit 151, the speaker 152, the camera 121, the first manipulation unit 131 and the like, and the second body 620 is illustrated having the second manipulation unit 132, the third manipulation unit 133, the microphone 122, the interface unit 170 and the like.

A luminous element assembly 630 and a solar cell 640 (see FIG. 13) applied to this embodiment may be disposed at a rear surface of the second body 620.

Besides, for a bar type terminal, if the display unit 151 is disposed on one surface of the terminal body, the luminous element assembly and the solar cell may be disposed at one side of the display unit 151 or on an opposite surface (another surface). This structure may be equally applicable to other types of terminals, such as a swing type, a swivel type and the like.

A battery cover 660 for covering the battery 190 (power supply unit) may be detachably mounted to a rear surface of the second body 620. The luminous element assembly 630 and the solar cell 640 may be mounted to the battery cover 660. In addition, the rear surface of the second body 620 is illustrated having connection terminals 661 for an electrical connection with the battery cover 660.

Figure 13:
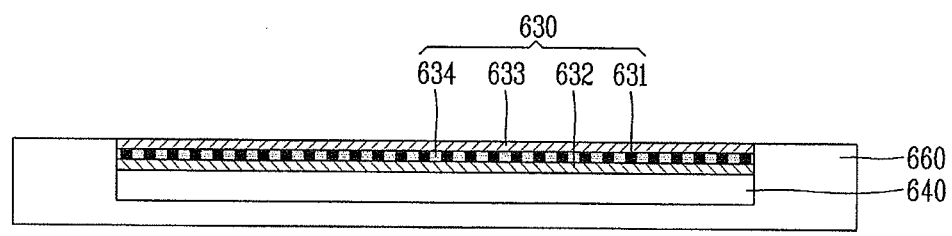
FIG. 13 is a sectional view of a battery cover taken along the line XIII-XIII of FIG. 12.

FIG. 13 is a sectional view of the battery cover of FIG. 12.

The battery cover 660 may be formed of a metal or synthetic resin, and include therein a solar cell 640 having luminous elements 631. The luminous element assembly 630 according to this embodiment, similar to the configuration of the first embodiment, may include luminous elements 631, a transparent sheet 632, a protection film 633 and the like. Other components described above may all be applicable to this embodiment. Here, the protection film 633 may preferably be formed semitransparent such that the luminous elements 631 cannot be visible from the exterior when not emitting light.

In addition, if the battery cover 660 is formed of the synthetic resin, the luminous element assembly 630 may be integrally formed with the battery cover 660 by an insert molding. Accordingly, the battery cover 660 can be slimmer in thickness and the components can be coupled together more strongly.

As described above, the present invention utilizes an installation space of a solar cell as a display space of visual information by use of the luminous element assembly, thereby providing a mobile terminal having improved space usability.

The present invention also disposes the luminous elements to be overlaid with the solar cell and thusly utilizes an installation space of the solar cell as a display space of visual information, thereby improving the space usability.

Also, the present invention allows information represented by the luminous elements to be touch-sensitive, thereby providing a structure capable of inputting information as well as outputting visual information.

Also, the present invention may implement two functions of touch detection and luminous signal transfer by use of single-layered transparent conductive patterns, thereby slimming a transparent touch input unit in thickness.

The aforesaid configuration and method for the mobile terminal is not to be construed as limiting the present disclosure. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:
1. A mobile terminal, comprising:
 a wireless communication unit configured to wirelessly communicate with at least one other terminal;
 a terminal body including a battery;

a solar cell disposed on one surface of the terminal body, and configured to convert light energy into electric energy to supply power to the battery;

a plurality of luminous elements configured to generate and emit light, and arranged on one surface of the solar cell, the plurality of luminous elements being arranged with having spaces left such that the solar cell absorbs light through the spaces non-arranged with the plurality of luminous elements;

a sheet disposed on a front surface of the solar cell and configured to support the plurality of luminous elements;

a protection layer formed onto a front surface of the sheet and configured to protect the plurality of luminous elements;

an intermediate portion located between the protection layer and the sheet and configured to fill the spaces; and a controller configured to control the plurality of luminous elements to display visual information and to execute a predetermined operation based on a selection of predetermined displaying luminous elements among the plurality of luminous elements, wherein each of the sheet, the protection layer and the intermediate portion is made of transparent materials such that ambient light of the mobile terminal is transmitted therethrough so as to reach the solar cell.

2. The terminal of claim 1, further comprising:
wherein the sheet includes transparent conductive patterns electrically connected to the plurality of luminous elements and configured to apply luminous signals to the plurality of luminous elements.

3. The terminal of claim 2,
wherein the protection layer comprises a transparent protection film attached onto the front surface of the sheet and configured to protect the plurality of luminous elements.

4. The terminal of claim 2, further comprising:
a touch sheet disposed on one surface of the sheet and configured to detect touch input on the visual information, said detected touch input corresponding to the selection of the predetermined displaying luminous elements among the plurality of luminous elements.

5. The terminal of claim 2, wherein each of the conductive patterns is configured to generate a touch signal upon a touch input being detected on the visual information.

6. The terminal of claim 5, wherein each of the conductive patterns comprises:
a first pattern having one end connected to one side of a corresponding luminous element;
a second pattern having one end connected to another side of the corresponding luminous element, the second pattern defining a touch region for detecting touch input together with the first pattern; and
transparent lines formed at other ends of the first and second patterns, respectively, and connected to the controller for controlling the plurality of luminous elements.

7. The terminal of claim 1, wherein the plurality of luminous elements are arranged in a matrix with preset intervals in horizontal and vertical directions.

8. The terminal of claim 1, wherein the controller is configured to selectively operate predetermined displaying luminous elements to represent the visual information.

9. The terminal of claim 1, wherein the visual information includes at least one of character, number, symbol and image.

10. The terminal of claim 1, wherein the visual information includes at least one of a name of an incoming caller, a phone number of the incoming caller and indication information indicating a generation of a specific event.

11. The terminal of claim 1, further comprising:
a display unit disposed on one surface of the terminal body and configured to display other information in addition to the displayed visual information by the plurality of luminous elements,
wherein the solar cell and the plurality of luminous elements are disposed at the other surface of the terminal body.

12. The terminal of claim 1, further comprising:
a battery cover detachably mounted to the terminal body and configured to shield the battery,
wherein the solar cell and the plurality of luminous elements are attached onto the battery cover.

13. The terminal of claim 1, wherein the terminal body includes a first body and a second body coupled to be relatively rotatable and implementing a closed configuration and an opened configuration, and
wherein the solar cell and the plurality of luminous elements are disposed on at least one of the first and second bodies.

14. The terminal of claim 13, wherein the solar cell and the plurality of luminous elements are disposed on an externally exposed surface in a closed configuration of the first or second body.

15. The terminal of claim 1, wherein the predetermined displaying luminous elements display audio/video commands, and the controller is further configured to execute a corresponding audio/video operation when a corresponding audio/video command is selected.

16. The terminal of claim 1, wherein the predetermined displaying luminous elements display phone calling or texting commands, and the controller is further configured to execute a corresponding phone calling or texting operation when a corresponding phone calling or texting command is selected.

17. A method of controlling a mobile terminal, the method comprising:
allowing, via a wireless communication unit, wireless communication with at least one other terminal;
displaying, via a controller included on the mobile terminal, visual information using a plurality of luminous elements arranged on one surface of a solar cell, said solar cell being disposed on one surface of a terminal body including a battery and configured to convert light energy into electric energy to supply power to the battery; and
executing a predetermined operation based on a selection of predetermined displaying luminous elements among the plurality of luminous elements,
wherein the plurality of luminous elements are arranged with having spaces left such that the solar cell absorbs light through the spaces non-arranged with the plurality of luminous elements,
wherein a sheet is disposed on a front surface of the solar cell and configured to support the plurality of luminous elements,
wherein a protection layer is formed onto a front surface of the sheet and configured to protect the plurality of luminous elements,
wherein an intermediate portion is located between the protection layer and the sheet and configured to fill the spaces, and
wherein each of the sheet, the protection layer and the intermediate portion is made of transparent materials such that ambient light of the mobile terminal is transmitted therethrough so as to reach the solar cell.

18. The method of claim 17, wherein the predetermined displaying luminous elements display audio/video commands, and the executing step executes a corresponding audio/video operation when a corresponding audio/video command is selected.

* * * * *